United States Patent
Ryu et al.

(10) Patent No.: US 10,085,201 B2
(45) Date of Patent: Sep. 25, 2018

(54) PATH SWITCH METHOD FOR DUAL CONNECTIVITY IN WIRELESS COMMUNICATION SYSTEM AND APPARATUS FOR SAME

(71) Applicant: LG ELECTRONICS INC., Seoul (KR)

(72) Inventors: Jinsook Ryu, Seoul (KR); Hyunsook Kim, Seoul (KR); Laeyoung Kim, Seoul (KR); Jian Xu, Seoul (KR); Daewook Byun, Seoul (KR); Taehyeon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 15/108,772

(22) PCT Filed: Jan. 14, 2015

(86) PCT No.: PCT/KR2015/000391
§ 371 (c)(1),
(2) Date: Jun. 28, 2016

(87) PCT Pub. No.: WO2015/108337
PCT Pub. Date: Jul. 23, 2015

(65) Prior Publication Data
US 2016/0323805 A1    Nov. 3, 2016

Related U.S. Application Data
(60) Provisional application No. 61/926,959, filed on Jan. 14, 2014.

(51) Int. Cl.
*H04W 36/30* (2009.01)
*H04W 40/36* (2009.01)
(Continued)

(52) U.S. Cl.
CPC ....... *H04W 40/36* (2013.01); *H04W 36/0016* (2013.01); *H04W 36/0055* (2013.01); *H04W 36/30* (2013.01); *H04W 76/15* (2018.02)

(58) Field of Classification Search
CPC ... H04W 40/36; H04W 76/025; H04W 36/30; H04W 36/0055; H04W 36/0016
See application file for complete search history.

(56) References Cited

U.S. PATENT DOCUMENTS

2005/0003819 A1* 1/2005 Wu .................. H04W 36/0066
455/436
2010/0113022 A1  5/2010 Motegi et al.
(Continued)

FOREIGN PATENT DOCUMENTS

EP         2469930        6/2012
KR    10-20070112128     11/2007
(Continued)

OTHER PUBLICATIONS

PCT International Application No. PCT/KR2015/000391, Written Opinion of the International Searching Authority dated Apr. 27, 2015, 33 pages.
(Continued)

*Primary Examiner* — Wei Zhao
(74) *Attorney, Agent, or Firm* — Lee, Hong, Degerman, Kang & Waimey

(57) ABSTRACT

The present invention relates to a method and an apparatus for determining a path switch in a wireless communication system. Specifically, the present invention relates to a method for determining a path switch of a first network entity, the method comprising the steps of: receiving bearer setup information including a bearer type regarding at least one bearer; transmitting a path switch request to a second network entity on the basis of the bearer setup information; receiving a path switch response corresponding to the path (Continued)

switch request from the second network entity; and determining a path switch depending on whether the path switch response indicates admission of a default bearer.

8 Claims, 9 Drawing Sheets

(51) Int. Cl.
*H04W 36/00* (2009.01)
*H04W 76/15* (2018.01)

(56) References Cited

U.S. PATENT DOCUMENTS

| | | | | |
|---|---|---|---|---|
| 2013/0170435 | A1* | 7/2013 | Dinan | H04L 45/50 370/328 |
| 2015/0208283 | A1* | 7/2015 | Yang | H04W 36/04 370/331 |

FOREIGN PATENT DOCUMENTS

| | | |
|---|---|---|
| KR | 10-2013-0028931 | 3/2013 |
| WO | 2010088795 | 8/2010 |
| WO | 2012/141480 | 10/2012 |

OTHER PUBLICATIONS

3rd Generation Partnership Project (3GPP), "Technical Specification Group Radio Access Network; Evolved Universal Terrestrial Radio Access (E-UTRA); Study on Small Cell Enhancements for E-UTRA and E-UTRAN—Higher Layer Aspects (Release 12)," 3GPP TR 36.842 V1.0.0, Nov. 2013, 68 pages.

European Patent Office Application Serial No. 15737516.3, Search Report dated Aug. 23, 2017, 45 pages.

Samsung et al., "Problem of bearer establishment", 3GPP TSG-RAN WG3 Meeting #63bis, R3-090855, Mar. 2009, 4 pages.

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.0.0, Dec. 2013, 208 pages.

European Patent Office Application Serial No. 15737516.3, Office Action dated Jul. 5, 2018, 46 pages.

Alcatel-Lucent, et al., "Signalling flows for dual connectivity architecture 1A", 3GPP TSG RAN WG3 Meeting #82, R3-132168, XP050738233, Nov. 2013, 4 pages.

3rd Generation Partnership Project (3GPP), "Technical Specification Group Radio Access Network; Evolved Universal Terrestrial Radio Access Network (E-UTRAN); S1 Application Protocol (S1AP) (Release 8)," 3GPP TS 36.413 V1.3.0, XP050163221, Nov. 2007, 126 pages.

* cited by examiner

PATH SWITCH METHOD FOR DUAL CONNECTIVITY IN WIRELESS COMMUNICATION SYSTEM AND APPARATUS FOR SAME

CROSS-REFERENCE TO RELATED APPLICATIONS

This application is the National Stage filing under 35 U.S.C. 371 of International Application No. PCT/KR2015/000391, filed on Jan. 14, 2015, which claims the benefit of U.S. Provisional Application No. 61/926,959, filed on Jan. 14, 2014, the contents of which are all hereby incorporated by reference herein in their entirety.

TECHNICAL FIELD

The present invention relates to a wireless communication system, and more particularly, to a path switching method for dual connectivity and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

An object of the present invention is to efficiently perform a path switch in relation to a dual connectivity-based communication mechanism.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of determining a path switch of a first network entity in a wireless communication system includes the steps of receiving bearer setup information including a bearer type for at least one or more bearers, transmitting a path switch request to a second network entity based on the bearer setup information, receiving a path switch response from the second network entity in response to the path switch request, and determining a path switch according to whether or not the path switch response indicates admission of a default bearer.

Preferably, the bearer type information indicates a default bearer or a dedicated bearer.

Preferably, the first network entity corresponds to a source eNB, the second network entity corresponds to a target eNB, and the path switch corresponds to handover. More preferably, the bearer setup information includes a QoS (quality of service) parameter and, if handover is determined according to the QoS parameter, the path switch request can further include information on a bearer type. More preferably, the second network entity is configured to preferentially admit a default bearer prior to a dedicated bearer when admission control is performed and, if the default bearer is not admitted, the path switch response indicates a handover failure. If the path switch response does not indicate admission of the default bearer, the first network entity terminates handover to the second network entity.

Preferably, the first network entity corresponds to a MeNB (master eNB), the second network entity corresponds to a SeNB (secondary eNB), and the path switch corresponds to a path switch procedure for dual connectivity. Preferably, the bearer type is included only when dual connectivity of a user equipment is determined to be performed according to at least one of whether or not the user equipment supports dual connectivity and whether or not an eNB supports dual connectivity. The path switch request is transmitted to a dedicated bearer only among the at least one or more bearers. If a path switch is requested for a default bearer, the second network entity performs admission control to make a resource to be preferentially allocated prior to ARP (allocation and retention priority). If the second network entity does not admit a default bearer, the first network entity is configured to maintain a service for the default bearer. If a path switch request for a default bearer is received from the second network entity, the first network entity is configured to admit the default bearer.

Preferably, the bearer setup information is received from an MME (mobility management entity).

To further achieve these and other advantages and in accordance with the purpose of the present invention, according to a different embodiment, a first network entity determining a path switch in a wireless communication system includes a radio frequency unit and a processor, the processor configured to receive bearer setup information including a bearer type for at least one or more bearers, the processor configured to transmit a path switch request to a second network entity based on the bearer setup information, the processor configured to receive a path switch response from the second network entity in response to the path switch request, the processor configured to determine a path switch according to whether or not the path switch response indicates admission of a default bearer.

Advantageous Effects

According to the present invention, it is able to prevent a service from being degraded by efficiently performing a path switch.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
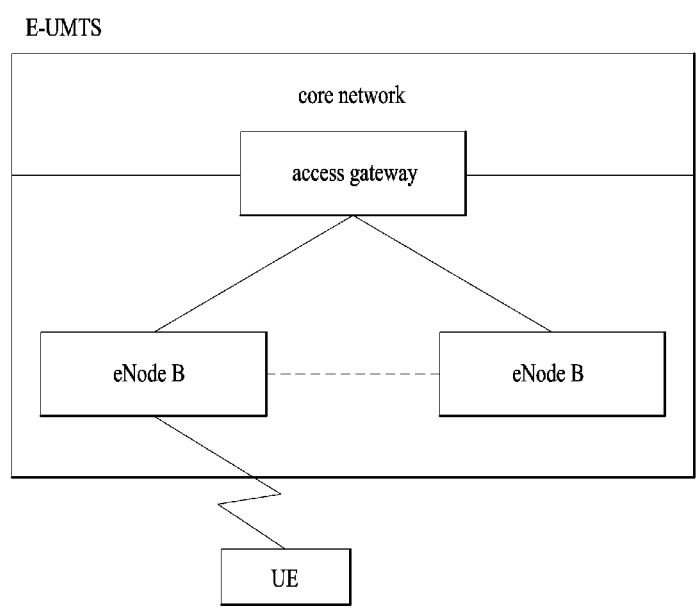
FIG. 1 is a schematic diagram of E-UMTS network structure as one example of a wireless communication system.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE (institute of electrical and electronics engineers) 802 system, 3GPP system, 3GPP LTE system, 3GPP LTE-A system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless communication systems. For clarity, the following description mainly concerns 3GPP LTE and LTE-A system, by which the technical idea of the present invention may be non-limited.

Terminologies usable in this disclosure can be defined as follows.

UMTS (universal mobile telecommunications system): a GSM (global system for mobile communication)-based $3^{rd}$ generation mobile communication technology developed by 3GPP.

EPS (evolved packet system): a network system consisting of an IP-based packet switched core network, i.e., EPC (evolved packet core) and an access network such as LTE, UTRAN and the like. The EPS is an evolved version of UMTS.

Node B: a base station of GERAN/UTRAN installed outdoors. Coverage of the Node B corresponds to a macro cell size.

eNode B: a base station of LTE installed outdoors. Coverage of the eNode B corresponds to a macro cell size.

UE (User equipment): user device. The user equipment may be named a terminal, an ME (mobile equipment), an MS (mobile station) and the like. The user equipment may correspond to such a device capable of being carried as a notebook, a cellular phone, a PDA (personal digital assistant), a smartphone, a multimedia device and the like. Or, the user equipment may correspond to such a device incapable of being carried as a PC (personal computer) and a device mounted on a vehicle. The UE corresponds to a device capable of performing communication using a 3GPP spectrum such as LTE and/or a non-3GPP spectrum such as Wi-Fi, spectrum for public safety, or the like.

RAN (radio access network): a unit including a Node B, an eNode B and an RNC (radio network controller) controlling the Node B and the eNode B in a 3GPP network. The RAN exists between a UE and a core network and provides a connection to the core network.

HLR (home location register)/HSS (home subscriber server): a database including subscriber information in a 3GPP network. The HSS may perform such a function as configuration storage, identity management, user state storage and the like.

RANAP (RAN application part): an interface between nodes (MME (mobility management entity)/SGSN (serving GPRS (general packet radio service) supporting node)/MSC (mobile switching center)) in charge of controlling a RAN and a core network.

PLMN (public land mobile network): a network configured to provide a mobile communication service to individuals. The PLMN can be configured according to an operator.

NAS (non-access stratum): a functional layer configured to transceive a signaling and a traffic message between a UE and a core network in UMTS protocol stack. A main function of the NAS is to support mobility of the UE and a session management procedure for establishing and maintaining an IP connection between the UE and a PDN GW (packet data network gateway).

HNB (Home Node B): a CPE (customer premises equipment) configured to provide UTRAN (UMTS terrestrial radio access network) coverage. For more details, it may refer to standard document TS 25.467.

HeNodeB (Home eNode B): a CPE (customer premises equipment) configured to provide E-UTRAN (evolved-UTRAN) coverage. For more details, it may refer to standard document TS 36.300.

CSG (closed subscriber group): a subscriber group permitted to access one or more CSG cells in PLMN (public land mobile network) as a member of CSG of H(e)NB.

LIPA (local IP access): accessing of a UE equipped with an IP function (IP capable) to an entity equipped with a different IP function in an identical residential/enterprise IP network via a H(e)NB. LIPA traffic does not pass through a network of a mobile communication service provider (operator). 3GPP release-10 system provides a user with accessing a resource on a local network (i.e., a network located at home or a company of a customer) via H(e)NB.

SIPTO (selected IP traffic offload): in 3GPP release-10 system, traffic offloading of a user is supported in a manner that a service provider selects a PGW (packet data network gateway) physically adjacent to a UE in EPC network.

PDN (packet data network) connection: a logical connection between a UE represented by a single IP address (one IPv4 address and/or one IPv6 prefix) and a PDN represented by an APN (access point name).

EPC (Evolved Packet Core)

Figure 2:
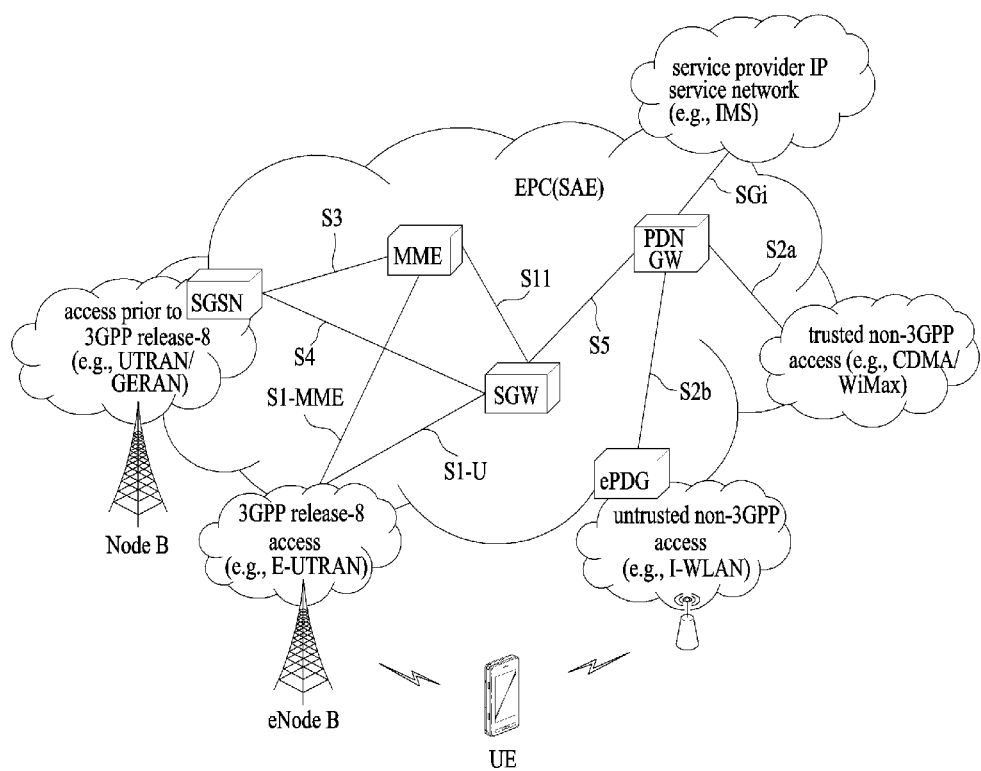
FIG. 2 is a diagram for a schematic structure of EPS (evolved packet system) including EPC (evolved packet core)

FIG. 2 is a view schematically illustrating the architecture of an Evolved Packet System (EPS) including an Evolved Packet Core (EPC).

The EPC is a core element of System Architecture Evolution (SAE) for improving the performance of 3GPP technology. SAE corresponds to a study item for deciding a network structure supporting mobility among various types of network. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In a legacy mobile communication system (e.g., 2nd or 3rd generation mobile communication system), a core network function is implemented through two separated sub-domains, e.g., circuit-switched (CS) sub-domain for sound and packet-switched (PS) sub-domain for data. However, in a 3GPP LTE system which is evolved from the 3rd generation communication system, the CS and PS sub-domains are unified into a single IP domain. For example, in the 3GPP LTE system, IP-capable UEs can be connected via an IP-based base station (e.g., eNodeB (evolved Node B)), an EPC, an application domain (e.g., IMS (IP Multimedia Subsystem)). That is, the EPC is a structure inevitably required to implement end-to-end IP service.

The EPC may include various components and FIG. 1 illustrates a few of the components, e.g., Serving GateWay (SGW), Packet Data Network GateWay (PDN GW), Mobility Management Entity (MME), Serving GPRS (General Packet Radio Service) Supporting Node (SGSN), and enhanced Packet Data Gateway (ePDG).

The SGW operates as a boundary point between a Radio Access Network (RAN) and a core network and is an element which performs a function for maintaining a data path between an eNodeB and a PDG GW. In addition, if a UE moves across an area served by an eNodeB, the SGW serves as a local mobility anchor point. That is, packets may be routed via the SGW for mobility in an Evolved-UMTS (Universal Mobile Telecommunications System) Terrestrial Radio Access Network (E-UTRAN) defined after 3GPP Release-8. Further, the SGW may serve as an anchor point for mobility management with another 3GPP network such as RAN defined before 3GPP Release-8, e.g., UTRAN or GSM (Global System for Mobile communication)/EDGE (Enhanced Data rates for GSM Evolution) Radio Access Network (GERAN).

The PDN GW (or P-GW) corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) or WiMax).

Although the SGW and the PDN GW are configured as separate gateways in the network architecture of FIG. 1, the two gateways may be implemented according to a single gateway configuration option.

The MME performs signaling and control functions to support access of a UE for network connection, network resource allocation, tracking, paging, roaming and handover. The MME controls control plane functions related to subscriber and session management. The MME manages a large number of eNodeBs and performs signaling for selection of a typical gateway for handover to another 2G/3G network.

In addition, the MME performs security procedures, terminal-to-network session handling, idle terminal location management, etc.

The SGSN handles all packet data such as mobility management and authentication of a user for another 3GPP network (e.g., GPRS network).

The ePDG serves as a security node for an untrusted non-3GPP network (e.g., I-WLAN, Wi-Fi hotspot, etc.).

As described above in relation to FIG. 1, an IP-capable UE may access an IP service network (e.g., IMS) provided by an operator, via various elements in the EPC based on non-3GPP access as well as 3GPP access.

FIG. 1 also illustrates various reference points (e.g., S1-U, S1-MME, etc.). In the 3GPP system, a conceptual link connecting two functions of different functional entities of E-UTRAN and EPC is defined as a reference point. Table 1 lists the reference points illustrated in FIG. 1. In addition to the examples of Table 1, various reference points may be present according to network architectures.

TABLE 1

| Reference Point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point for providing a user plane with related control and mobility support between the trusted non-3GPP access and the PDNGW. S2b is a reference point for providing a user plane with related control and mobility support between the ePDG and the PDNGW.

EPS Bearer Concept

In 3GPP EPS (Evolved Packet System), an EPS bearer corresponds to a user plane path. The EPS bearer may correspond to a path on which up/down IP flow is transmitted and received.

If a user equipment (UE) is attached to an EPS system, an IP address is assigned and a default bearer is generated for each PDN connection. And, if QoS (quality of service) is not satisfied by a default bearer, a dedicated bearer is generated for a service. Once a default bearer is generated, the default bearer is maintained until a corresponding PDN is disconnected. And, it is necessary to maintain at least one or more default bearers until a UE is detached from the EPS.

Figure 3:
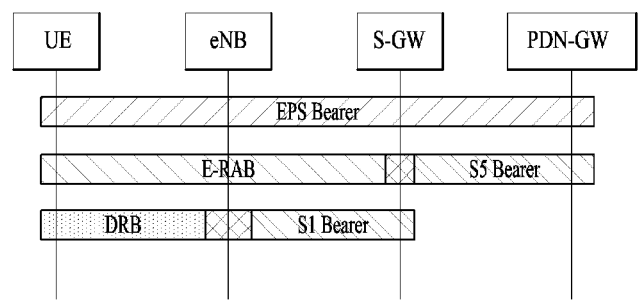
FIG. 3 is a diagram for a structure of a bearer (or EPS bearer)

FIG. 3 is a diagram for a structure of a bearer (or EPS bearer).

A bearer (or an EPS bearer) is named differently depending on a section to which the bearer belongs thereto. As shown in FIG. 3, an EPS bearer is classified into an E-RAB and an S5 bearer depending on a section to which the EPS bearer belongs thereto. In particular, a section of an EPS bearer existing at the time that a UE is in an idle state (ECM-IDLE) corresponds to the S5 bearer. If the UE enters a connected mode (ECM-CONNECTED), a connection is established between the UE and a P-GW while E-RAT is setup.

In addition, referring to FIG. 3, E-RAB transmits packets of an EPS bearer between a UE and an EPC. When the E-RAB exists, one-to-one mapping is established between the E-RAB and the EPS bearer. A data radio bearer (DRB) transmits packets of the EPS bearer between the UE and the eNB. When the DRB exists, one-to-one mapping is established between the DRB and the EPS bearer/E-RAB.

And, the S1 bearer transmits packets of the E-RAB between the eNode B and the S-GW (serving GW). The S5/S8 bearer transmits packets of the EPS bearer between the S-GW (serving GW) and the P-GW (PDN GW).

Moreover, regarding the aforementioned structure of the bearer, it may refer to LTE/LTE-A standard document, 36.300 13.1 'Bearer service architecture'.

Small Cell

Figure 4:
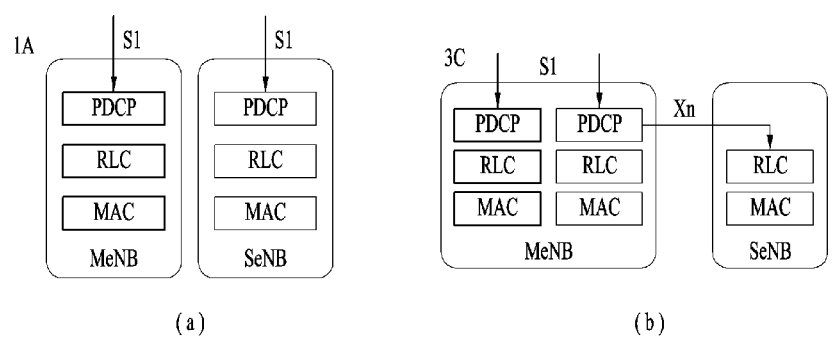
FIG. 4 is a diagram for dual connectivity related to a small cell.

Small cell is a main technology of 3GPP RAN. Study on standardization of the small cell is in progress. FIG. 4 is a diagram for explaining dual connectivity on the basis of TR 36.842 in relation to a small cell. Dual connectivity consists of one MeNB and a UE including at least one SeNB.

1A solution of a user plane for dual connectivity is explained in the following with reference to FIG. 4 (*a*). The 1A solution corresponds to S1-U combination for terminating a SeNB and independent PDCPs (no bearer split). 3C solution of a user plane for dual connectivity is explained in the following with reference to FIG. 4 (*b*). The 3C solution corresponds to S1-U combination for terminating a MeNB, split bearers in the MeNB, and independent RLCs for the split bearers.

And, in case of a control plane, a MeNB has all controls and controls mobility of a UE and the like. In particular, a SeNB can transmit and receive a user plane only.

X2-Based Handover

Figure 5:
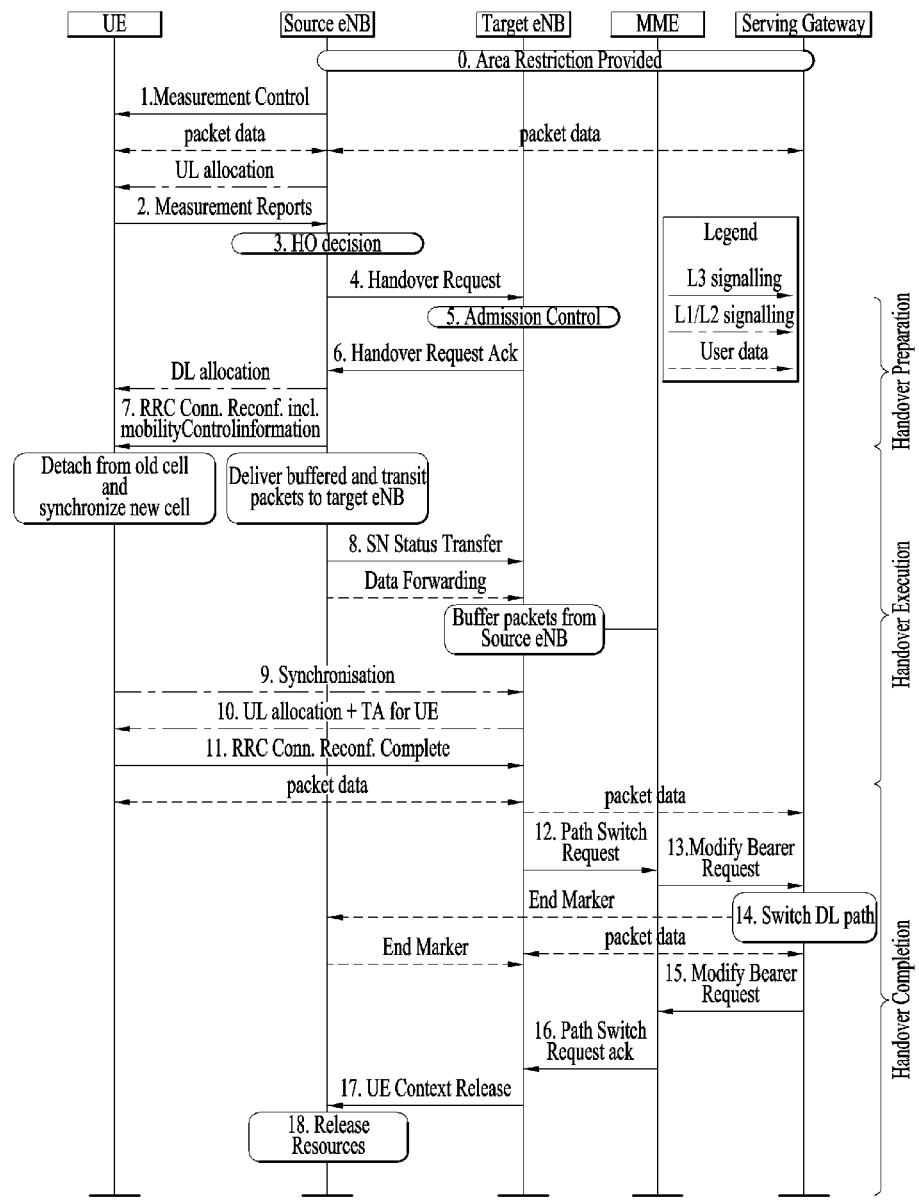
FIG. 5 is a flowchart for explaining handover and X2-based handover.

First of all, in order to explain X2-based handover, it may refer to FIG. 5 on 'Handover' of 10.1.2.1 of 36.300 corresponding to LTE/LTE-A standard. It is able to implement a path switch procedure, which is implemented by X2-based handover scheme, with reference to FIG. 5.

X2-based handover is explained in the following. As shown in Table 2, a source eNB determines whether or not a UE performs handover (e.g., 'step 3 HO decision', the source eNB determines whether or not the UE performs handover based on mobility of the UE and load informations) and transmits a handover request to a target eNB together with corresponding information (e.g., E-RABs to be setup list) (step 4 of FIG. 5).

Having received the handover request, the target eNB executes admission control (step 5 of FIG. 5) in response to the received E-RAB list. In this case, it may perform admission control on the E-RAB setup according to a resource situation of the target eNB. It may be able to determine it on the basis of GBR/non-GBR information and E-RAB level QoS parameters (refer to Table 2) which are provided according to E-RAB.

TABLE 2

| IE/Group Name | Presence | Range | IE type and reference | Semantics description | Criticality | Assigned Criticality |
|---|---|---|---|---|---|---|
| QCI | M | | INTEGER (0 . . . 255) | QoS Class Identifier defined in TS 23.401 [12]. Logical range and coding specified in TS 23.203 [13]. | — | — |
| Allocation and Retention Priority | M | | 9.2.31 | | — | — |
| GBR QoS Information | O | | 9.2.10 | This IE applies to GBR bearers only and shall be ignored otherwise. | — | — |

The target eNB can transmit handover request acknowledge or a handover preparation failure to the source eNB based on a result of the admission control (step 6 of FIG. 5).

In this case, if at least one or more non-GBR E-RABs are selected from among the E-RAB list requested by the source eNB, the target eNB considers it as a handover success and transmits a handover request acknowledge to the source eNB in a manner of including corresponding E-RAT setup information in E-RABs admitted list.

If it is unable to admit a single non-GBR E-RAB, the target eNB transmits a handover preparation failure to the source eNB. Having received the handover request acknowledge from the target eNB, the source eNB performs steps 7, 8, 9, 10, and 11 of FIG. 5 to camp a UE on the target eNB and performs data forwarding via a uplink data path.

In the step 12 of FIG. 5, the target eNB sends a path switch request to an MME. Having received the path switch request, the MME performs a procedure related to 'X2-based handover without serving GW relocation' written on 5.5.1.1.2 paragraph of 3GPP TS 23.401 of LTE/LTE-A standard document (refer to Table 3).

TABLE 3

5.5.1.1.2 X2-based handover without Serving GW relocation (TS 23.401)

If the default bearer of a PDN connection has not been accepted by the target eNodeB and there are multiple PDN connections active, the MME shall consider, all bearers of that PDN connection as failed and release that PDN connection by triggering the MME requested PDN disconnection procedure specified in clause 5.10.3.
If none of the default EPS bearers have been accepted by the target eNodeB or there is a LIPA PDN connection that has not been released, the MME shall act as specified in step 6.
If none of the default EPS bearers have been switched successfully in the core network or if they have not been accepted by the target eNodeB or the LIPA PDN connection has not been released, the MME shall send a Path Switch Request Failure message (see more detail in TS 36.413 [36]) to the target eNodeB. The MME performs explicit detach of the UE as described in the MME initiated detach procedure of clause 5.3.8.3.

In particular, if an eNB end is unable to admit E-RAB corresponding to a default bearer in the middle of performing X2-handover, the MME disconnects a PDN connection after a UE is handed over to the target eNB. At worst, the MME performs MME initiated detach on the UE.

For more precise procedure, it may refer to 'Handover' of 3GPP TS 36.000 10.1.2.1 paragraph, 'Path Switch' of 10.1.2.2 paragraph of 3GPP TS 36.000 and 'X2-based handover' of 3GPP TS 23.401 5.5.1.1 paragraph.

Path Switch for Dual Connectivity (Small Cell)

Figure 6:
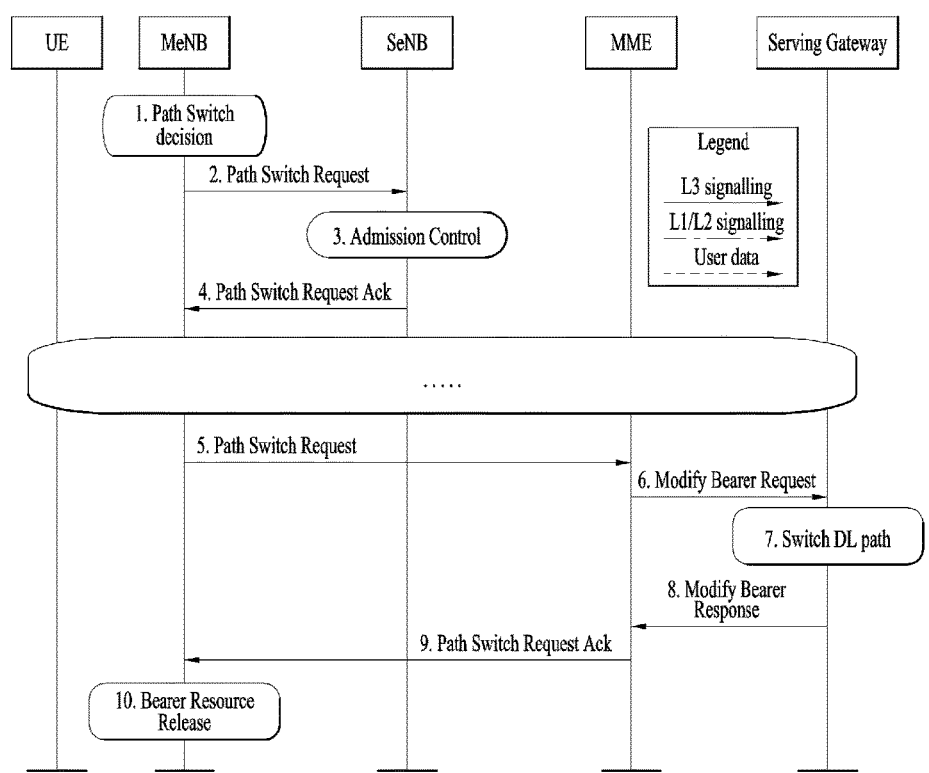
FIG. 6 is a flowchart for an example of a path switch procedure for dual connectivity.

FIG. 6 is a flowchart for explaining an example of a path switch procedure for dual connectivity.

Referring to FIG. 6, similar to the aforementioned X2-based handover, if a MeNB determines a path switching, the MeNB makes a request for admission control on E-RAB to a SeNB and the SeNB transmits a result of the request to the MeNB. Yet, if a path switching is accepted, a main entity for requesting the path switching to an MME becomes the MeNB instead of the target eNB.

In particular, when a default bearer is released in the middle of performing legacy X2-handover (e.g., when a bearer is not admitted in the middle of performing admission control in a target eNB), if an MME receives a path switch request, the MME recognizes the request and commands a PDN connection to be disconnected or a UE to be detached.

In particular, if the target eNB is able to admit a non-GBR bearer corresponding to a default bearer instead of a different non-GBR since the target eNB is aware of whether or not E-RAB is default (default or dedicated), the aforementioned unsuccessful case may not occur. Or, if the SeNB is unable to admit the non-GBR bearer (if the SeNB has no choice but to receive a different non-GBR bearer only), the target eNB knows whether or not it is a failure in advance and may stop the procedure.

In particular, in case of dual connectivity, more frequent path switching is required compared to a case of X2-based handover. In case of the X2-based handover, eNB path switching is required due to mobility of a UE in many cases in addition to load balancing. On the contrary, in case of the dual connectivity, various path switching are required according to ongoing service of a UE as well as mobility and load balancing.

In particular, it may be able to anticipate such a path switching as Serving MeNB<->SeNB, SeNB<->SeNB, SeNB<->Target MeNB, Serving MeNB<->Target MeNB, etc. In case of a SeNB, an unsecure case may occur due to smaller coverage and more frequent mobility compared to a MeNB. Hence, when initial deployment is performed, it is able to anticipate many trials and errors. Hence, when an access network end performs E-RAB handling, it is highly probable that such a service disruption as PDN disconnection and UE detach occur due to unnecessary default bearer release.

Hence, in the following, a method of enabling an access network to perform more robust small cell handling and handover by making the access network recognize a parameter (e.g., bearer type) related to bearer handling of a core network end is explained based on the aforementioned contents for a case among cases including i) dual connectivity bearer offloading, ii) bearer path switching and iii) handover of small cell environment according to the present invention.

Hence, according to the present invention, it may be able to prevent such a user experience as PDN connection release and the like from being degraded, quickly detect a handover preparation failure and a path switch failure, and enable a UE to perform a service in an optimized eNB (cell).

According to the related art, one of methods of performing dual connectivity for small cell enhancement is a traffic offloading scheme that a bearer serviced by a controlling MeNB (master eNB) is switched into a SeNB (secondary eNB) where dual connectivity is available. A path switching can be performed according to a bearer (E-RAB). In this case, all bearers (user plane) of a corresponding user equipment can be offloaded into the SeNB. By doing so, since a simultaneous service is enabled through the MeNB and the SeNB, it is able not only to increase throughput of the user equipment but to avoid a complex situation.

Yet, a parameter used for the legacy MeNB to determine whether to switch a path may correspond to load information of the MeNB, load information of the SeNB and a bearer of the user equipment, i.e., QoS information on E-RAB only. The MeNB can determine whether to perform offloading onto the SeNB on the basis of the parameter.

Hence, when E-RAB is set up, the present invention proposes to transmit not only QoS information but also a bearer type (default or dedicated) and subscription information to the MeNB. By doing so, it is able to maximize QoE (quality of experience) of an end user and network efficiency in a manner of more efficiently determining whether or not the E-RAB is switched according to a situation when the MeNB performs offloading.

Hence, a method of preventing a default bearer from being released and an operation when a default bearer is released are mainly explained in the present invention.

In particular, according to the present invention, it is able to prevent a PDN of a UE from being disconnected and prevent a UE from being detached from an EPS system by minimizing release of a default bearer. If a default bearer is released, an access network may determine the release in advance, stop making a handover to a corresponding cell (target eNB) and attempt to make a handover to a different E-UTRAN cell or a different RAT rather than determine the failure too late after all normal procedures are processed up to a core network (e.g., MME). By doing so, it is able to make a UE stably operate. In particular, according to the present invention, if unnecessary signaling is minimized and a network is able to quickly cope with a release of a default bearer, it may be able to reduce service interruption of an end user and increase network efficiency.

According to the present invention, when a bearer is setup, if a core network node (e.g., MME) notifies not only an E-RAB level QoS parameter but also a bearer type per E-RAB (a default bearer or a dedicated bearer), it may be able to use the parameter and the bearer type for admission control in case of performing handover and in case of determining a path switch for dual connectivity.

In this case, the core network node (e.g., MME) can inform an access network (e.g., a source eNB) of a bearer type for a specific case only. More specifically, the core network node can optionally inform the access network of a bearer type according to whether or not dual connectivity is supported by an eNB (eNB capability) or a UE (UE capability). In particular, whether dual connectivity supported by a UE (dual connectivity capability) is synchronous or asynchronous is set according to each band combination. This information is stored in UE context of an MME.

In particular, if the UE performs initial context setup via a service request or the like to enter ECM-CONNECTED, the eNB can determine whether to perform dual connectivity on the UE. (In this case, whether to perform dual connectivity on the UE can be determined according to UE capability and a situation of the eNB. For example, whether to perform dual connectivity on the UE can be determined based on at least one selected from the group consisting of synchronous, asynchronous and band combination)

Hence, when the MME performs initial context setup according to the present invention, in order to additionally transmit a bearer type, it may be able to determine based on whether or not the UE supports dual connectivity (dual connectivity capability). Moreover, an MME can optionally configure according to whether or not dual connectivity of a corresponding region or an operation is secured according to O&M (operation and maintenance).

For example, when an initial dual connectivity is deployed, in order to make a default bearer to be served from a MeNB, the MME transmits a bearer type in the middle of performing initial context setup. On the contrary, if dual connectivity management of a corresponding region stably operates, the MME can make a default bearer to be offloaded onto a SeNB without transmitting a bearer type.

Figure 7:
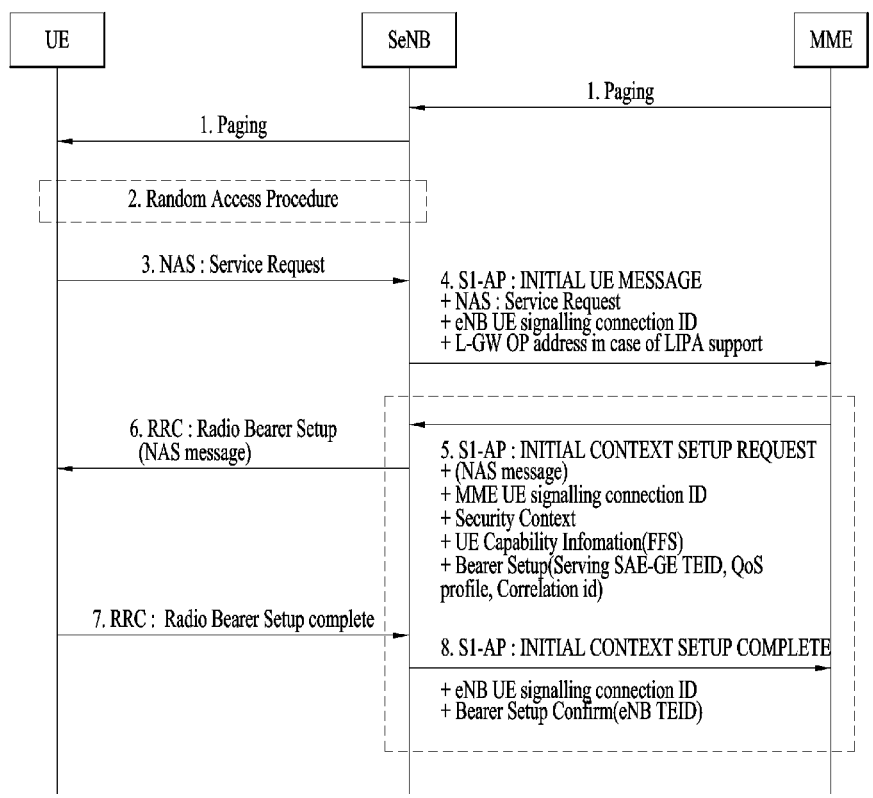
FIG. 7 is a flowchart for an initial context setup operation.

FIG. 7 is a flowchart for an initial context setup operation.

Referring to FIG. 7, when an initial context is setup (e.g., when a UE switches a mode from an idle mode to a connected mode), the MME can additionally transmit a bearer type of a corresponding bearer to a QoS parameter of an initial context setup request message for handover and robust bearer movement of dual connectivity. Hence, if the MME additionally transmits a bearer type, since it is able to preferentially cope with a default bearer when such a resource as admission control and the like are allocated for handover and dual connectivity, it may be used as a tool for preventing PDN of a UE from being disconnected and preventing the UE from being detached due to a default bearer drop.

Referring to FIG. 7, after a paging message is transmitted to a UE from an MME via an eNB (step 1), the UE and the eNB establish a connection by performing a random access procedure (step 2).

The UE transmits a NAS (non-access stratum) message to the eNB to make a request for a service (step 3). Subsequently, the eNB transmits an S1-AP initial UE message to the MME (step 4). In case of supporting a service request, an eNB UE signaling connection ID, and LIPA, the initial UE message can include L-GW IP address and the like.

Subsequently, the MME transmits an S1-AP initial context setup request message to the eNB (step 5). In this case, the S1-AP initial context setup request message includes such information as a NAS message, an MME UE signaling connection ID, security context, UE capability information, bearer setup, and the like. In this case, the bearer setup includes a serving SAE-GW TEID, QoS profile, and a correlation ID.

Having received the S1-AP initial context setup request message, the eNB delivers radio bearer setup via RRC signaling (step 6).

Subsequently, the UE delivers radio bearer setup complete to the eNB via RRC signaling (step 7) and the eNB transmits an S1-AP initial context setup complete message to the MME (step 8). In this case, the S1-AP initial context setup complete message includes eNB-UE signaling connection ID and bearer setup confirmation (eNB TEID). For more details on the initial context setup, it may refer to 8.3.1 paragraph of 36.413 corresponding to LTE/LTE-A standard document.

Moreover, the S1-AP initial context setup request message can be represented as Table 4 and the E-RAB level QoS parameters can be represented as Table 5 according to the present invention.

TABLE 4

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | M | | 9.2.1.20 | | YES | reject |
| E-RAB to Be Setup List | | 1 | | | YES | reject |
| >E-RAB to Be Setup Item IEs | | 1 . . . <maxnoofE-RABs> | | | EACH | reject |
| >>E-RAB ID | M | | 9.2.1.2 | | — | |
| >>E-RAB Level QoS Parameters | M | | 9.2.1.15 | Includes necessary QoS parameters. | — | |
| >>Transport Layer Address | M | | 9.2.2.1 | | — | |
| >>GTP-TEID | M | | 9.2.2.2 | | — | |
| >>NAS-PDU | O | | 9.2.3.5 | | — | |
| >>Correlation ID | O | | 9.2.1.80 | | YES | ignore |
| >>SIPTO Correlation ID | O | | Correlation ID 9.2.1.80 | | YES | ignore |
| UE Security Capabilities | M | | 9.2.1.40 | | YES | reject |
| Security Key | M | | 9.2.1.41 | The KeNB is provided after the key-generation in the MME, see TS 33.401 [15]. | YES | reject |
| Trace Activation | O | | 9.2.1.4 | | YES | ignore |
| Handover Restriction List | O | | 9.2.1.22 | | YES | ignore |
| UE Radio Capability | O | | 9.2.1.27 | | YES | ignore |
| Subscriber Profile ID for RAT/Frequency priority | O | | 9.2.1.39 | | YES | ignore |
| CS Fallback Indicator | O | | 9.2.3.21 | | YES | reject |
| SRVCC Operation Possible | O | | 9.2.1.58 | | YES | ignore |
| CSG Membership Status | O | | 9.2.1.73 | | YES | ignore |
| Registered LAI | O | | 9.2.3.1 | | YES | ignore |
| GUMMEI | O | | 9.2.3.9 | This IE indicates the MME serving the UE. | YES | ignore |
| MME UE S1AP ID 2 | O | | 9.2.3.3 | This IE indicates the MME UE S1AP ID assigned by the MME. | YES | ignore |
| Management Based MDT Allowed | O | | 9.2.1.83 | | YES | ignore |
| Management Based MDT PLMN List | O | | MDT PLMN List 9.2.1.89 | | YES | ignore |
| Additional CS Fallback Indicator | C-ifCSFB high priority | | 9.2.3.37 | | YES | ignore |
| Masked IMEISV | O | | 9.2.3.38 | | YES | ignore |
| Expected UE Behaviour | O | | 9.2.1.96 | | YES | ignore |

TABLE 5

| IE/Group Name E-RAB Level QoS Parameters | Presence | Range | IE type and reference | Semantics description |
|---|---|---|---|---|
| >QCI | M | | INTEGER (0 . . . 255) | QoS Class Identifier defined in TS 23.401 [11]. Coding specified in TS 23.203 [13]. |
| >Allocation and Retention Priority | M | | 9.2.1.60 | |
| >GBR QoS Information | O | | 9.2.1.18 | This IE applies to GBR bearers only and shall be ignored otherwise. |
| >Bearer Type | O | | ENUMERATED (Default bearer, Dedicated bearer) | This IE is used identify whether the bearer type is default bearer or dedicated bearer. |

Moreover, as mentioned in the foregoing description, when initial context setup is performed, whether or not a bearer type is added can be determined based on stability of a corresponding network and dual connectivity capability of the UE and the eNB.

Moreover, a core network node (e.g., MME) can additionally transmit not only a bearer type but also subscription information of the UE necessary for handling a bearer.

Handover According to the Present Invention

First of all, handover according to the present invention is explained.

A source eNB receives bearer setup information from an MME. In this case, the source eNB can also receive QoS information on a bearer (i.e., E-RAB) from the MME. In this case, information on a bearer type can be additionally received from the MME.

In this case, the source eNB (which has performed initial context setup) uses a bearer type to preferentially make a request for accepting a default bearer (e.g., resource allocation) by indicating the bearer type to a target eNB. Moreover, when it fails to transmit a bearer type via X2 interface, if the target eNB does not accept a default bearer, the source eNB can quickly determines it as a handover failure. In this case, it may be able to stay more in the source eNB or may make a handover to a different available eNB.

If the source eNB considers QoS information on a received bearer and determines to perform path switching in consideration of the QoS information, the source eNB transmits a handover request to the target eNB.

In this case, when the target eNB performs admission control on bearer information (e.g., E-RAB list) requested by the source eNB, the target eNB preferentially admits E-RAB corresponding to a default bearer among E-RABs. In this case, ARP (allocation and retention priority) information can be ignored. Yet, if it is unable to admit the default bearer (resource allocation), although the target eNB is able to admit a different non-GBR, the target eNB considers it as a handover preparation failure and makes a response to the source eNB. Hence, the source eNB determines it as a state that the default bearer is released and is able to quickly attempt to make a handover to a different E-UTRAN cell or other-RAT cell again.

If the source eNB only knows a bearer type (default or dedicated) or a handover request acknowledgement is received from the target eNB while a default bearer is not admitted, although both the source eNB and the target eNB know the bearer type, the source eNB does not consider it as a handover success and may terminate a handover procedure. In this case, if the source eNB is unable to stay at a serving cell, the source eNB may attempt to make a handover to a different cell or may attempt to make a (UTRAN, GERAN) handover by changing a RAT.

Figure 8:
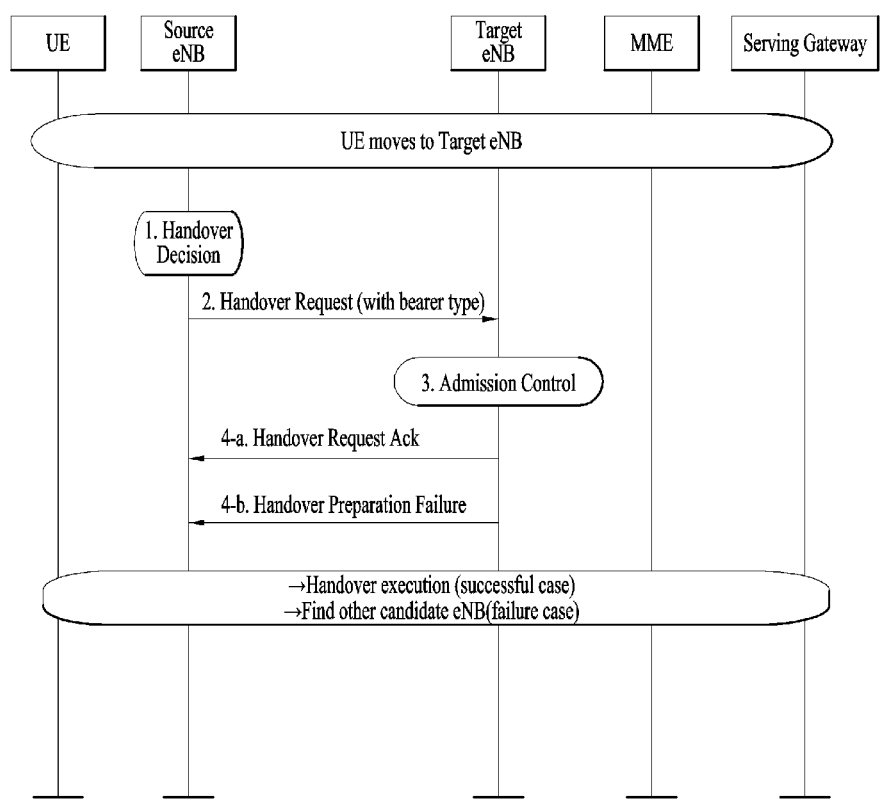
FIGS. 8 and 9 are flowcharts for embodiments of performing handover according to the present invention.

FIG. 8 is a diagram for an embodiment that a source eNB notifies a bearer type as well when the source eNB transmits a handover request according to the present invention.

Referring to FIG. 8, when a source eNB determines to perform handover (step 1 of FIG. 8), the source eNB transmits a handover request including a bearer type to a target eNB (step 2 of FIG. 8).

The target eNB determines whether or not a handover is available by preferentially admitting a default bearer (step 3 of FIG. 8) in response to the handover request and determines a handover request ACK (step 4-*a* of FIG. 8) or a handover preparation failure (step 4-*b* of FIG. 8) to be transmitted to the source eNB. In particular, if it is unable to admit even the default bearer, the target eNB considers it as a handover preparation failure and transmits a handover preparation failure message to the source eNB.

If the source eNB receives a handover request ACK from the target eNB in response to the handover request including a bearer type, the source eNB considers it as a handover preparation success and may be then able to perform an additional procedure.

Figure 9:
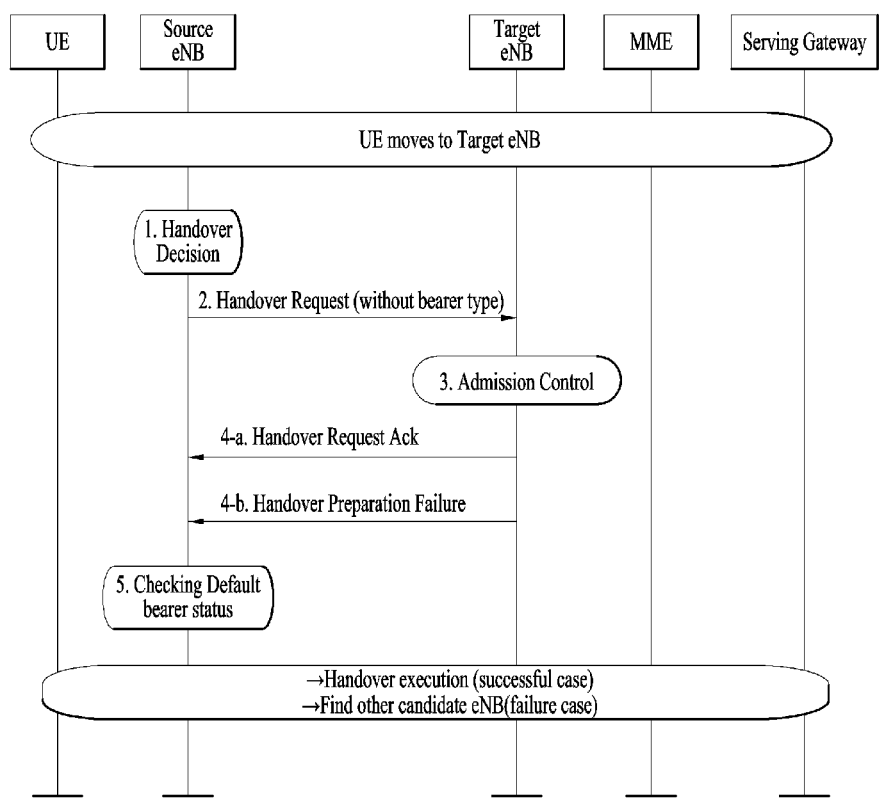

FIG. 9 is a diagram for an embodiment that a source eNB does not notify a bearer type when the source eNB transmits a handover request according to the present invention. Among steps shown in FIG. 9, explanation on steps identical to the steps of FIG. 8 is omitted. It may refer to the aforementioned contents for the explanation.

In FIG. 9, assume that a source eNB receives a bearer type from an MME when initial context setup is performed and the source eNB does not inform a target eNB of the bearer type when handover is performed (step 2 of FIG. 9).

Hence, the target eNB performs admission control using a QoS value only without information on a bearer type. If the target eNB is able to admit even one of non-GBR bearers, the target eNB transmits a handover request ACK to the source eNB.

Having received the handover request ACK, the source eNB checks an admission status of a default bearer. If the default bearer is admitted by the target eNB, the source eNB considers it as handover preparation has succeeded. If the source eNB determines that the default bearer is not admitted by the target eNB, the source eNB considers it as handover preparation has failed (e.g., although a handover request ACK is received from the target eNB, it is considered as a failure) and searches for a different available eNB (step 5 of FIG. 9).

Dual Connectivity According to the Present Invention

A case of dual connectivity according to the present invention is explained.

As mentioned in the foregoing description, a MeNB receives bearer setup information including a bearer type from an MME based on UE support capability, eNB support capability, and the like.

When the MeNB makes a decision on path switching, in case of E-RAB determined as a default bearer, the MeNB does not switch a path to a SeNB or maintain the E-RAB in the MeNB as long as possible in a manner of deferring priority based on the received information on the bearer type.

If the MeNB makes a request for a path switching of a default bearer (e.g., E-RAB) to the SeNB, the SeNB performs admission control (e.g., resource allocation) in a manner of giving top priority to the default bearer. In this case, ARP can be ignored. In this case, if the SeNB does not admit the E-RAB (default bearer), which has requested a path switching, the MeNB can continuously maintains a service in a manner of not performing path switching or deferring priority. If the SeNB makes a request for a path switching of E-RAB (default bearer) serviced by the SeNB to the MeNB, the MeNB admits the E-RAB with top priority.

In particular, unlike the aforementioned handover according to the present invention, according to the dual connectivity scheme of the present invention, the E-RAB not admitted by the target eNB (i.e., SeNB) can be continuously serviced by the MeNB.

Hence, according to the present invention, when dual connectivity is performed, although a bearer is moved to the SeNB, the MeNB may not move a default bearer as much as possible. And, although movement of a bearer is inevitable, it may be able to make the SeNB admit the bearer as much as possible by transmitting a bearer type of the bearer to the SeNB. If the SeNB replies that admission is impossible, it may be able to make a default bearer not to be dropped in a manner that the MeNB admits the default bearer again and the like.

Figure 10:
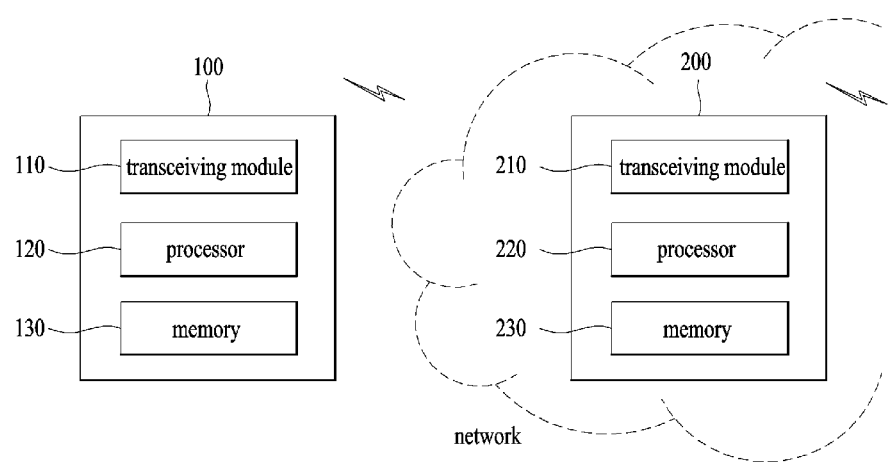
FIG. 10 is a diagram for a user equipment and a network node according to an example of the present invention.

FIG. 10 is a diagram of a configuration for a preferred embodiment of a user equipment and a network node according to an example of the present invention.

Referring to FIG. 10, a user equipment 100 according to the present invention can include a transceiving module 110, a processor 120 and a memory 130. The transceiving module 110 can be configured to transmit various signals, data and information to an external device and receive various signals, data and information from the external device. The user equipment 100 can be connected with the external device in wired and/or wireless. The processor 120 can control overall operation of the user equipment 100 and can be configured to perform a function of calculating information to be transceived with the external device. The memory 130 can store calculated information for a prescribed time and can be replaced with a configuration element such as a buffer (not depicted) or the like.

Referring to FIG. 10, a network node 200 according to the present invention can include a transceiving module 210, a processor 220 and a memory 230. The transceiving module 210 can be configured to transmit various signals, data and information to an external device and receive various signals, data and information from the external device. The network node 200 can be connected with the external device in wired and/or wireless. The processor 220 can control overall operation of the network node 200 and can be configured to perform a function of calculating information to be transceived with the external device. The memory 230 can store calculated information for a prescribed time and can be replaced with a configuration element such as a buffer (not depicted) or the like.

The configurations of the user equipment 100 and the network node 200 as described above may be implemented such that the above-described embodiments can be independently applied or two or more thereof can be simultaneously applied, and description of redundant parts is omitted for clarity.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

Embodiments of the present invention are applicable to various mobile communication systems.

What is claimed is:

1. A method of determining a path switch for dual connectivity of a first network entity in a wireless communication system, comprising:
receiving bearer setup information containing a bearer type for at least one or more bearers;
transmitting a path switch request to a second network entity based on the bearer setup information;
receiving a path switch response from the second network entity in response to the path switch request; and
determining a path switch according to whether or not the path switch response indicates admission of a default bearer,
wherein the first network entity corresponds to a MeNB (master eNB), and wherein the second network entity corresponds to a SeNB (secondary eNB).

2. The method of claim 1, wherein the bearer type is contained only when dual connectivity of a user equipment is determined to be performed according to at least one of whether or not the user equipment supports dual connectivity or whether or not an eNB supports dual connectivity.

3. The method of claim 1, wherein the path switch request is transmitted to a dedicated bearer only among the at least one or more bearers.

4. The method of claim 1, wherein if the path switch is requested for a default bearer, the second network entity performs admission control to make a resource to be preferentially allocated prior to ARP (allocation and retention priority).

5. The method of claim 1, wherein if the second network entity does not admit a default bearer, the first network entity is configured to maintain a service for the default bearer.

6. The method of claim 1, wherein if a path switch request for a default bearer is received from the second network entity, the first network entity is configured to admit the default bearer.

7. The method of claim 1, wherein the bearer setup information is received from an MME (mobility management entity).

8. A first network entity determining a path switch for dual connectivity in a wireless communication system, comprising:
a radio frequency (RF) unit; and
a processor,
wherein the processor is configured to:
control the RF unit to receive bearer setup information containing a bearer type for at least one or more bearers;
control the RF unit to transmit a path switch request to a second network entity based on the bearer setup information;
control the RF unit to receive a path switch response from the second network entity in response to the path switch request; and
determine a path switch according to whether or not the path switch response indicates admission of a default bearer,
wherein the first network entity corresponds to a MeNB (master eNB), and
wherein the second network entity corresponds to a SeNB (secondary eNB).

* * * * *